(12) United States Patent
Gelineau et al.

(10) Patent No.: US 10,459,113 B2
(45) Date of Patent: Oct. 29, 2019

(54) USER SELECTABLE REMOTE PROGRAMMING FOR CASCADE-CONNECTED LIGHT CURTAINS

(71) Applicant: Banner Engineering Corp., Plymouth, MN (US)

(72) Inventors: Matthew Michael Gelineau, Blaine, MN (US); Charles Lee Osborn, Albertville, MN (US); Michael Shawn Bechtold, Brooklyn Park, MN (US)

(73) Assignee: Banner Engineering Corp., Plymouth, MN (US)

( * ) Notice: Subject to any disclaimer, the term of this patent is extended or adjusted under 35 U.S.C. 154(b) by 606 days.

(21) Appl. No.: 14/947,377

(22) Filed: Nov. 20, 2015

(65) Prior Publication Data
US 2017/0146687 A1 May 25, 2017

(51) Int. Cl.
*G01V 8/00* (2006.01)
*G01V 8/20* (2006.01)
(Continued)

(52) U.S. Cl.
CPC ............... *G01V 8/20* (2013.01); *F16P 3/144* (2013.01); *G01V 8/10* (2013.01); *G08B 13/183* (2013.01)

(58) Field of Classification Search
CPC .......... G01V 8/20; G01V 8/10; G08B 13/181; G03B 13/183; F16P 3/144
(Continued)

(56) References Cited

U.S. PATENT DOCUMENTS

| 5,198,661 A * | 3/1993 | Anderson | G01V 8/20 250/221 |
| 6,624,751 B2 * | 9/2003 | Haberer | G01V 8/20 250/221 |

(Continued)

OTHER PUBLICATIONS

Banner Engineering Corp., EZ-Screen LS Safety Light Screen, Instruction Manual, Sep. 8, 2015, Banner Engineering Corp., Minneapolis, MN.
(Continued)

*Primary Examiner* — Georgia Y Epps
*Assistant Examiner* — Kevin Wyatt
(74) *Attorney, Agent, or Firm* — Craige Thompson; Thompson Patent Law; Vincent Musgrove

(57) ABSTRACT

Apparatus and associated methods relate to activating a blanking programming mode, such as fixed blanking (FB) or floating blanking (FLB), for example, for at least one user-selectable light curtain segment proximally connected to a distal-most segment in a string of cascaded light curtain segments. In an illustrative example, the selective activation may be initiated in response to a request signal from a remote request generator. The remote request generator may, in some examples, communicate the request signal to initiate the programming mode via a wireless communication link. In some embodiments, a request interface module may receive the request signal while releasably plugged into a terminal end of the distal-most segment. In various implementations, the remote selective activation may advantageously empower operators to rapidly configure cascaded light curtain systems that require programming modes for functions such as, for example, FB, FLB, or reduced resolution.

20 Claims, 8 Drawing Sheets

(51) Int. Cl.
  *G08B 13/183* (2006.01)
  *G01V 8/10* (2006.01)
  *F16P 3/14* (2006.01)
(58) Field of Classification Search
  USPC .................. 250/559.01, 559.12, 559.13
  See application file for complete search history.

(56) References Cited

U.S. PATENT DOCUMENTS

| | | | | |
|---|---|---|---|---|
| 7,329,854 | B2 * | 2/2008 | Clifton | G01V 8/20 250/221 |
| 7,368,702 | B2 * | 5/2008 | Kudo | F16P 3/144 250/221 |
| 2005/0052639 | A1 * | 3/2005 | Hartl | G01V 8/20 356/139.03 |
| 2008/0122615 | A1 * | 5/2008 | Shoenfeld | G08B 13/14 340/540 |
| 2009/0129784 | A1 * | 5/2009 | Camicelli | G01V 8/20 398/154 |
| 2009/0242374 | A1 * | 10/2009 | Ohsumi | H01H 13/88 200/5 A |
| 2009/0303032 | A1 * | 12/2009 | Bork | G01V 8/20 340/506 |
| 2010/0066568 | A1 * | 3/2010 | Lee | H01H 3/125 341/22 |

OTHER PUBLICATIONS

Rockwell Automation, GuardShield Type 4 and GuardShield Remote Teach, User Manual, Aug. 2012, Rockwell Automation, Milwaukee, WI.
Omron STI, MiniSafe 4800 Series Safety Light Curtains, Installation and Operating Manual, 2010, Omron STI, Fremont, CA.
Omron, Safety Light Curtain F3Sg-RA, May 2015, p. 1, Chicago, IL.

* cited by examiner

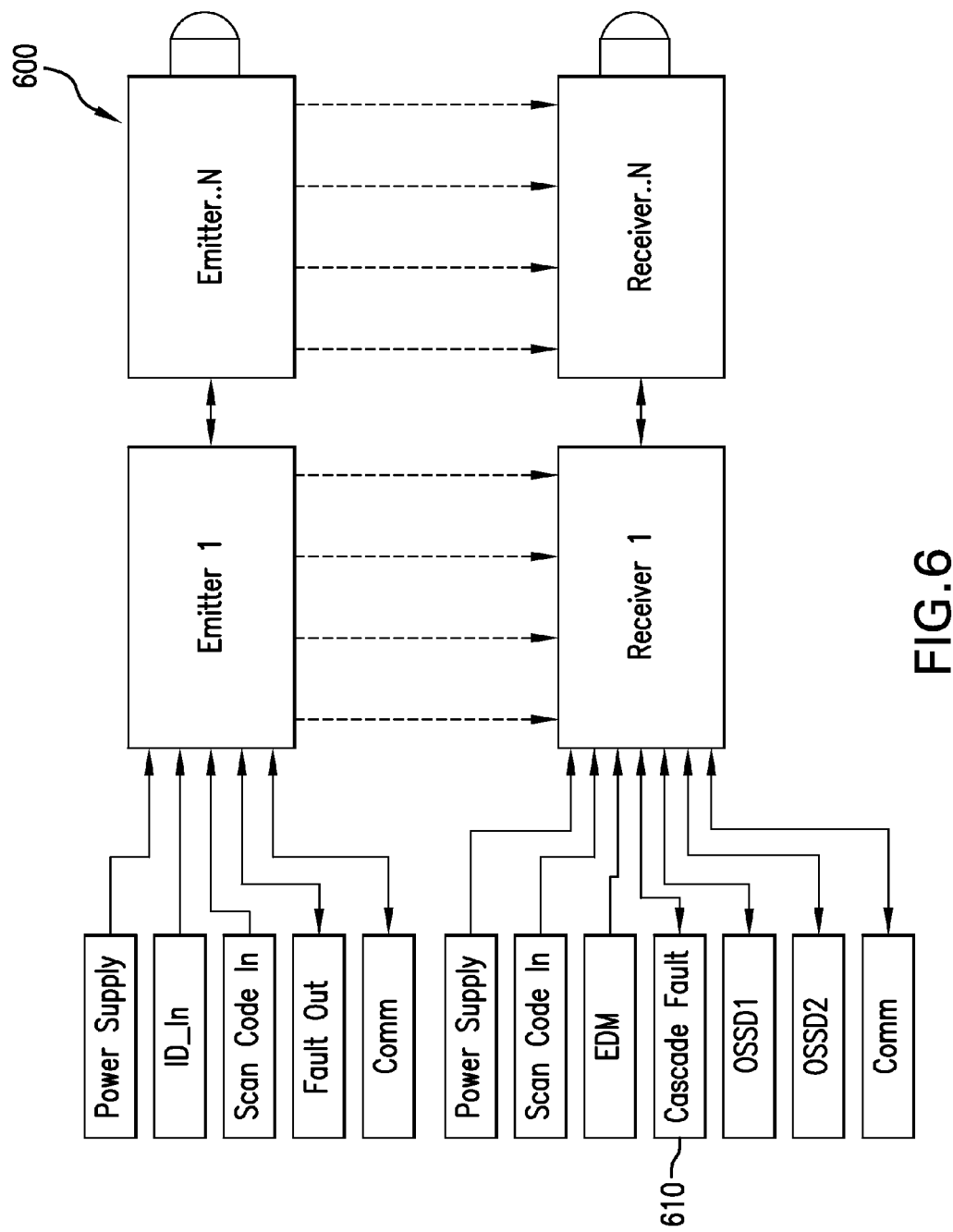

USER SELECTABLE REMOTE PROGRAMMING FOR CASCADE-CONNECTED LIGHT CURTAINS

TECHNICAL FIELD

Various embodiments relate generally to remote programming for cascaded light curtains, and may specifically relate to, for example, fixed or floating blanking.

BACKGROUND

Manufacturing facilities produce useful articles by processing component into finished goods. The operations used to process the components may involve transformational steps that change the article from one state to another. Some of these transformational operations employ machinery, such as presses, cutting tools, conveyor systems, ovens, or chemical applicators, for example.

Some manufacturing facilities use machinery that can be dangerous to humans. For example, a worker who walks into a zone of operation of a large robotic arm is at risk of serious bodily harm if the arm's motion profile intersects the worker's body or clothing. In another example, a worker who places a work piece in a press and reaches into the press while the press is activated could be severely injured.

To promote safety for operators and machines, many manufacturing machines are protected, either partially or entirely surrounded by light curtain systems. A light curtain safety system may cause a machine to be deactivated when an object interrupts any portion of the light curtain. For example, a hand extending through the light curtain may block one or more beams of the light curtain, which the light curtain may interpret as a potential danger condition. The light curtain may typically respond by causing the machine to be deactivated by, for example, engaging a braking system and/or interrupting electric power to motor drives that cause a press to move. A light curtain safety system may also prevent a machine from being activated when an object is present in any portion of the light curtain. For example, prior to machine startup, an operator who is standing too close, or within hazardous proximity, to a machine may block one or more beams of the light curtain. The light curtain may interpret this as a danger condition and prevent machine startup.

In some installations protected by a light curtain system, it may be desirable to program the system to permit machinery to continue to run even in the presence of certain beams being blocked. In some instances, this ability to continue to run protected machinery while selected beams are being blocked is called "fixed blanking" In a fixed blanking implementation, the system will not shut off the protected equipment just because certain optical beams are blocked. Thus, a fixed blanking function allows a protected system to be programmed to continue to run even while some object (e.g., a shelf, conveyor belt, or other stationary object) is blocking certain selected optical beams in the light curtain system.

SUMMARY

Apparatus and associated methods relate to activating a blanking programming mode, such as fixed blanking (FB) or floating blanking (FLB), for example, for at least one user-selectable light curtain segment proximally connected to a distal-most segment in a string of cascaded light curtain segments. In an illustrative example, the selective activation may be initiated in response to a request signal from a remote request generator. The remote request generator may, in some examples, communicate the request signal to initiate the programming mode via a wireless communication link. In some embodiments, a request interface module may receive the request signal while releasably plugged into a terminal end of the distal-most segment. In various implementations, the remote selective activation may advantageously empower operators to rapidly configure cascaded light curtain systems that require programming modes for functions such as, for example, FB, FLB, or reduced resolution.

Various embodiments may achieve one or more advantages. For example, some embodiments may provide integral, field-installable, or field-replaceable, omni-directional, request interface modules for cascadable light curtain systems. Some embodiments may advantageously initiate certain requested operations, such as, for example, fixed blanking programming mode, from a remote location. In some examples, an operator may remotely cause one or more selected light curtain segments to enter an operator-selected mode while located in a more convenient location than the terminal end of a cascaded string of light curtain segments. Such systems may permit the operator to rapidly configure one or more cascaded light curtains. This may advantageously dramatically reduce or substantially minimize costly, labor intensive, or complex setup and configuration times for light curtains, some of which may be inconvenient to access manually or with direct cabling for the purpose of temporary learning of a new programming mode. In some implementations, a remote wireless request generator may be in the form of a hand held mobile platform, such as a tablet computer. In some examples, a mobile platform may be programmed to display a graphical user interface (GUI) to facilitate operator control over one or many uniquely addressable light curtain segments, which may be alone or cascaded at any position within one or more uniquely addressable sets of cascaded light curtains. In various examples, a low skilled operator may be able to configure, for example, a selected cascaded light curtain to operate with a function such as fixed blanking in order to accommodate certain configurations of the environment that may interfere with certain light beams of the light curtain system, for example. Various embodiments may permit in situ field programming without the need to access local manual controls (e.g., dip switches) located on the light curtain string. Accordingly, various embodiments may, without compromising light curtain performance, save time, expense, and increase production facility uptime, and thereby improve output productivity for a facility that incorporates cascaded light curtain systems, for example. Such advantages may be further enhanced in dynamic environments where a light curtain system must re-enter its programming mode(s) to accommodate changes, such as in the light curtain setup, the location or shape of items that pass through the light curtain, and/or the apparatus behind the protective light curtain, for example.

The details of various embodiments are set forth in the accompanying drawings and the description below. Other features and advantages will be apparent from the description and drawings, and from the claims.

BRIEF DESCRIPTION OF THE DRAWINGS

FIG. 6 depicts a schematic block diagram of an exemplary cascadable light curtain system operable with a RMRGM interface module.

Like reference symbols in the various drawings indicate like elements.

DETAILED DESCRIPTION OF ILLUSTRATIVE EMBODIMENTS

To aid understanding, this document is organized as follows. First, FIGS. 1-2 introduce embodiments of cascade-connected light curtain systems in implementations that call for programming, via wired and wireless linkages, from remote mode request generator modules (RMRGM). Second, with reference to FIG. 3, the discussion turns to exemplary steps for operating a processor in a cascadable light curtain segment to receive, react to, and retransmit a remote programming mode request message (PMRM) originating from a remote request generator module. Finally, with reference to FIGS. 4-7, schematic block diagrams of exemplary cascadable light curtain systems operable with a RMRGM interface module are presented to explain exemplary embodiments for responding to remote programming mode signals in cascade-connected light curtain systems.

Figure 1:
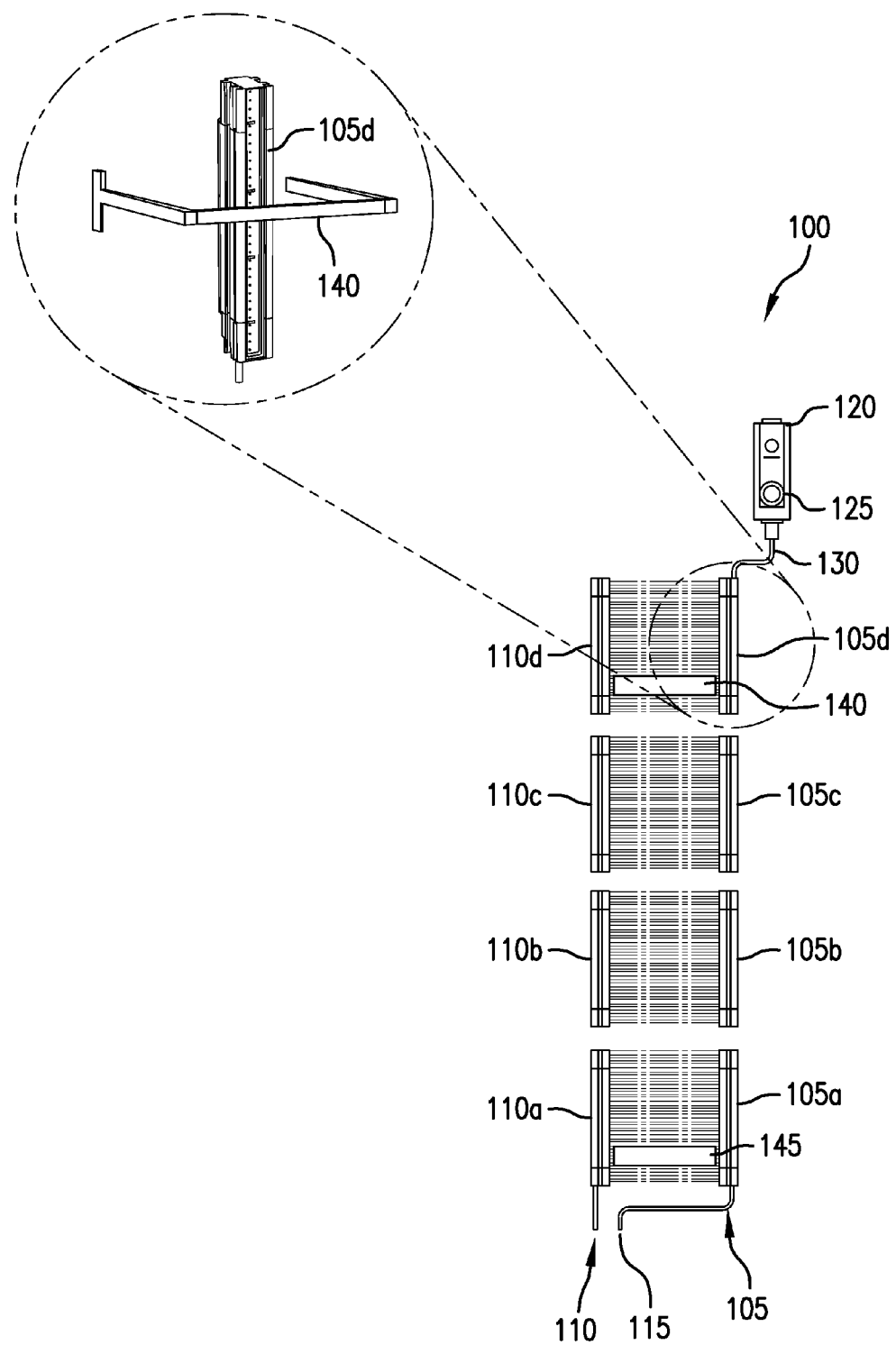
FIG. 1 depicts a schematic view of equipment with an extension member protected by an exemplary cascade-connected light curtain system operably responsive to a user selection at a remote mode request generator module (RMRGM).

FIG. 1 depicts a schematic view of equipment with an extension member protected by an exemplary light curtain system operably responsive to a user selection at a remote mode request generator module (RMRGM). In the depicted figure, a protective light curtain system 100 includes a cascade-connected receiver (RX) string 105, which is formed by a cascade connection of RX light curtain modules (LCM) 105a, 105b, 105c, and 105d. The protective light curtain system 100 also includes a cascade-connected emitter (TX) string 110, which is formed by a cascade connection of TX LCMs 110a, 110b, 110c, and 110d. In normal operation, each of the modules of the RX string 105 are configured to be in optical communication with optical beams generated by a corresponding module of the TX string 110. In various embodiments, the RX LCM 105a-105d are configured to respond in a coordinated manner to a remotely-generated programming mode request message (PMRM), which may also be referred to more broadly herein as a mode request signal. The individual RX LCM 105a-105d may distribute the programming mode request message through the cascade-connected RX LCM 105a-105d. In various embodiments, the PMRM may be propagated through the RX string 105 to one of the RX LCM 105a-105d configured in a master mode. The RX LCM 105a-105d that receives the request message while in the master mode may identify which of the RX LCM 105a-105d are to be placed into a predetermined mode, which, for example, may be a programming mode to learn which optical beams require fixed (or floating) blanking treatment.

In some embodiments, the RX LCM 105a-105d that is in master mode may identify which of the cascade-connected RX LCM 105a-105d are to be placed in a predetermined programming mode based upon the content of the request message. According to the determination it makes, the master mode RX LCM 105a-105d may issue a command signal to cause each of the one or more identified RX LCM 105a-105d to transition into the programming mode. In some embodiments, each of identified RX LCM 105a-105d may substantially synchronously enter the programming mode. By way of example, and not limitation, while in the programming mode, each of the identified RX LCM 105a-105d may detect the presence or absence of an optical beam at a particular receiver location, for the purpose of learning which receivers in the light curtain system 100 should have their normal response to a blocked beam or a received beam altered so that they behave according to fixed blanking or floating blanking protocols.

The RX string 105 may detect whether the light beams are being received or not (e.g., blocked). In normal operation, failure of the RX string 105 to detect one or more light beams may indicate a safety breach, and the light curtain system 100 is operative to generate signals to disable a machine (not shown) via machine control lines 115, until the light beams are cleared. The machine control lines 115 connect to a proximal end of each of the cascade-connected strings 105, 110.

At a distal end of the RX string 105, the RX LCM 105d is operatively connected to a remote fixed blanking (RFB) switch accessory 120. The RFB switch accessory 120 includes a user input control 125 to receive user input commands from an operator.

In an illustrative example, in response to user input commands, the RFB switch accessory 120 may generate a programming mode request message and transmit that request message to the RX LCM 105d via a communication link 130. In response, the RX LCM 105d, acting as a slave segment in the cascaded RX string 105, may retransmit or propagate an indication that the programming mode request message has been received to the next proximally-adjacent RX LCM 105c. In response, the RX LCM 105c, acting as a slave segment in the cascaded RX string 105, may retransmit or propagate an indication that the programming mode request message has been received to the next proximally-adjacent RX LCM 105b. In response, the RX LCM 105b, acting as a slave segment in the cascaded RX string 105, may retransmit or propagate an indication that the programming mode request message has been received to the next proximally-adjacent RX LCM 105a. In response, the RX LCM 105a, acting as a master segment in the cascaded RX string 105, may process the indication that the programming mode request message has been received, identify which of the RX LCM 105a-105d are to be placed into a predetermined mode, and generate a programming mode command to cause each one of the identified RX LCM 105a-105d to enter into a programming mode according to the programming mode request message.

In the depicted figure, a block apparatus 140 is disposed in a position that blocks at least one of the optical beams transmitted by the TX LCM 110d to be received by the RX LCM 105*d*. Similarly, a block apparatus 145 is disposed in a position that blocks at least one of the optical beams transmitted by the TX LCM 110*a* to be received by the RX LCM 105*a*.

The depicted embodiment advantageously provides for configuration of the cascade-connected segments RX LCM 105*a*-105*d* so that the light curtain system 100 applies signals to the machine control lines 115 that will enable the protected equipment to operate despite the presence of blocking apparatus 140 and the blocking apparatus 145. In particular, the operator can induce each of the cascaded-connected light curtain segments LCM RX 105*a*-105*d* to enter programming mode by operation of the RFB switch accessory 120. Upon user input to the RFB switch accessory 120, each of the cascade-connected segments of the RX string 105 may enter a fixed blanking programming mode, also referred to herein as learn mode. In the depicted example, the RX LCM 105*a*, 105*d* would determine which optical beams are blocked by the blocking apparatus 145, 140, respectively. After exiting the programming mode, which may be in response to a further user input to the RFB switch accessory 120, the light curtain system 100 may operate to enable operation of the machine controlled by the machine control lines 115 even though certain determined optical beams are being blocked by the apparatus 140, 145.

Figure 2:
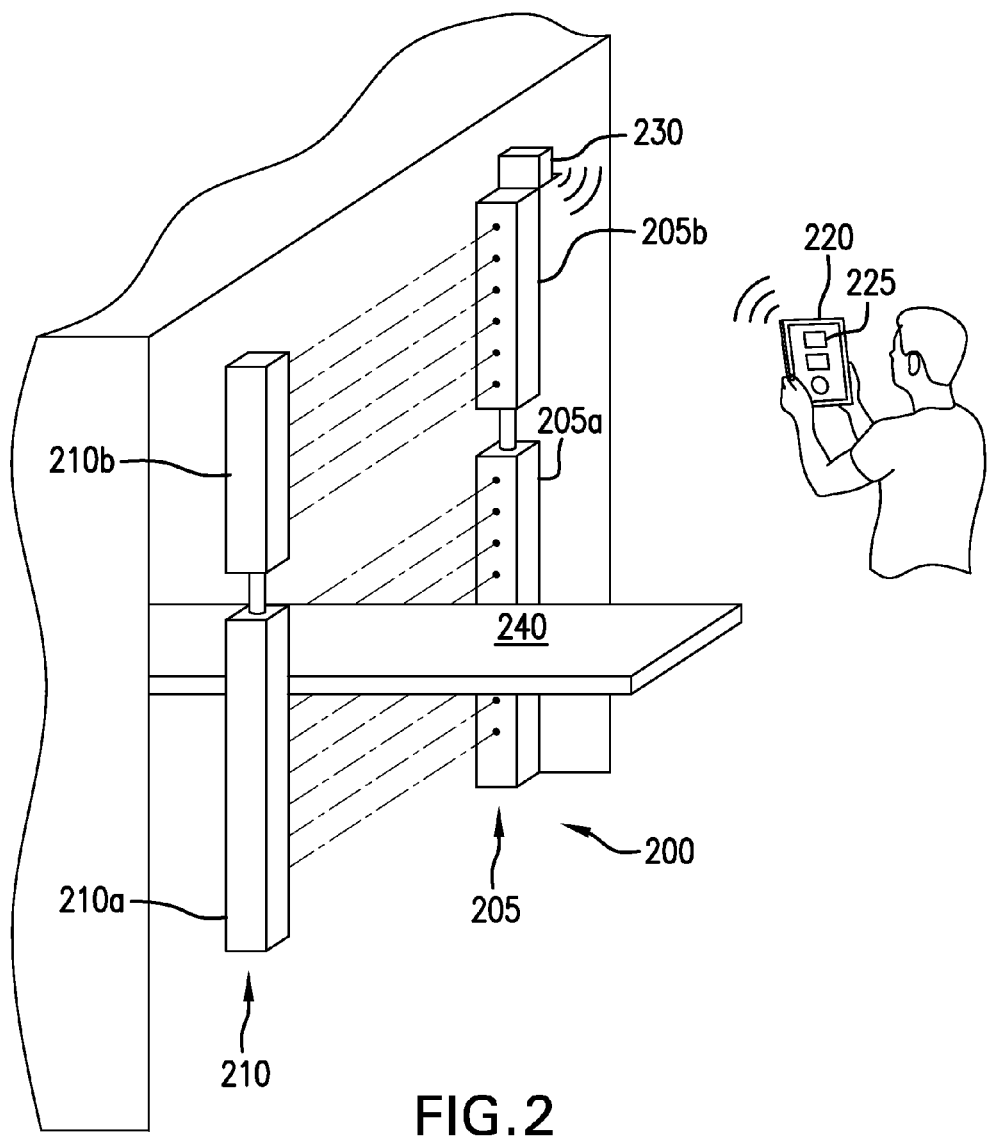
FIG. 2 depicts a schematic view of equipment with an extension member protected by an exemplary cascade-connected light curtain system operably responsive to a user selection at a remote mode request generator module (RMRGM) via a wireless link.

FIG. 2 depicts a schematic view of equipment with an extension member protected by an exemplary cascade-connected light curtain system operably responsive to a user selection at a remote mode request generator module (RMRGM) via a wireless link.

In the depicted figure, a protective light curtain system 200 includes a cascade-connected receiver (RX) string 205, which is formed by a cascade connection of RX light curtain modules (LCM) 205*a*, 205*b*. In various embodiments, the RX LCMs 205*a* and 205*b* may be the same or different size modules. The protective light curtain system 200 also includes a cascade-connected emitter (TX) string 210, which is formed by a cascade connection of TX LCMs 210*a*, 210*b*. In various embodiments, the TX LCMs 210*a* and 210*b* may be the same or different size modules. In normal operation, each of the modules of the RX string 205 are configured to be in optical communication with optical beams generated by a corresponding module of the TX string 210. In various embodiments, the RX LCM 205*a*-205*b* are configured to respond in a coordinated manner to a remotely-generated programming mode request message (PMRM), which may also be referred to more broadly herein as a mode request signal. The individual RX LCM 205*a*-205*b* may distribute the programming mode request message through the cascade-connected RX LCM 205*a*-205*b*. In various embodiments, the PMRM may propagate through the RX string 205 to one of the RX LCM 205*a*-205*b* configured in a master mode. The RX LCM 205*a*-205*b* that receives the request message while in the master mode may identify which of the RX LCM 205*a*-205*b* are to be placed into a predetermined mode, which, for example, may be a programming mode to learn which optical beams require fixed (or floating) blanking treatment, or to enable reduced resolution throughout the system, for example.

In some embodiments, the RX LCM 205*a*-205*b* that is in master mode may identify which of the cascade-connected RX LCM 205*a*-205*b* are to be placed in a predetermined programming mode based upon the content of the request message. According to the determination it makes, the master mode RX LCM 205*a*-205*b* may issue a command signal to cause each of the identified RX LCM 205*a*-205*b* to transition into the programming mode. In some embodiments, each of identified RX LCM 205*a*-205*b* may substantially synchronously enter the programming mode. By way of example, and not limitation, while in the programming mode, the identified RX LCM 205*a* may detect the presence or absence of an optical beam at a particular receiver location, for the purpose of learning which receivers in the protective light curtain system 200 should have their normal response to a blocked beam or a received beam altered so that they behave according to fixed blanking or floating blanking protocols.

The RX string 205 may detect whether the light beams are being received or not (e.g., blocked). In normal operation, failure of the RX string 205 to detect one or more light beams may indicate a safety breach, and the protective light curtain system 200 is operative to generate signals to disable a machine via machine control lines (not shown) until the light beams are cleared.

At a distal end of the RX string 205, the RX LCM 205*b* is in operative wireless communication with a remote mode request generator module (RMRGM) 220. The RMRGM 220 includes a user interface 225 operative to receive user input commands from an operator. In various embodiments, the user input commands may cause operations to be performed to cause user-selected segments of the cascade-connected light curtain system 200 to enter a user selected programming mode. The RMRGM 220 may transmit programming mode request messages (PMRM), for example. In the depicted embodiment, the RX LCM 205*b* connects to a RMRGM interface module 230 that receives the PMRM via the wireless link, and conveys the PMRM to the distal-most RX LCM 205*b*. The interface module 230 may be pluggably mounted to any available cascade port in the protective light curtain system 200.

In an illustrative example, the RX LCM 205*b*, acting as a slave segment in the cascaded RX string 205, may retransmit or propagate an indication that the programming mode request message (PMRM) has been received to the next proximally-adjacent RX LCM 205*a*. In response, the RX LCM 205*a*, acting as a master segment in the cascaded RX string 205, may process the indication that the programming mode request message has been received, identify which of the RX LCM 205*a*-205*b* are to be placed into a predetermined mode, and generate a programming mode command to cause each one of the identified RX LCM 205*a*-205*b* to enter into a programming mode according to the PMRM.

In the depicted figure, a block apparatus 240 is disposed in a position that blocks at least one of the optical beams to be received by the RX LCM 205*a*.

The depicted embodiment advantageously provides for configuration of the cascade-connected segments RX LCM 205*a*-205*b* so that the light curtain system 200 applies signals to the machine control lines that will enable the protected equipment to operate despite the presence of blocking apparatus 240. In particular, the operator can induce selected cascaded-connected light curtain segments LCM RX 205*a*-205*b* to enter programming mode by operation of the RMRGM 220. In an illustrative example, upon user input to the RMRGM 220, the operator may select for training or programming the RX LCM 205*a* via user interface 225. In this case, only the cascade-connected segments of the RX string 205 that are user-selected, i.e., RX LCM 205*a*, will enter a fixed blanking programming mode.

In the depicted example, the RX LCM 205*a* would enter the programming mode to determine which optical beams are blocked by the blocking apparatus 240. Accordingly, the non-selected RX LCM 205*b* effectively serves as a transparent pass-through communication link from the interface module 230 to the user-selected RX LCM 205a. After exiting the programming mode, which may be in response to a further user input to the RMRGM 220, the protective light curtain system 200 may operate to enable operation of the machine controlled by the machine control lines even though certain determined optical beams are being blocked by the apparatus 240.

Figure 3:
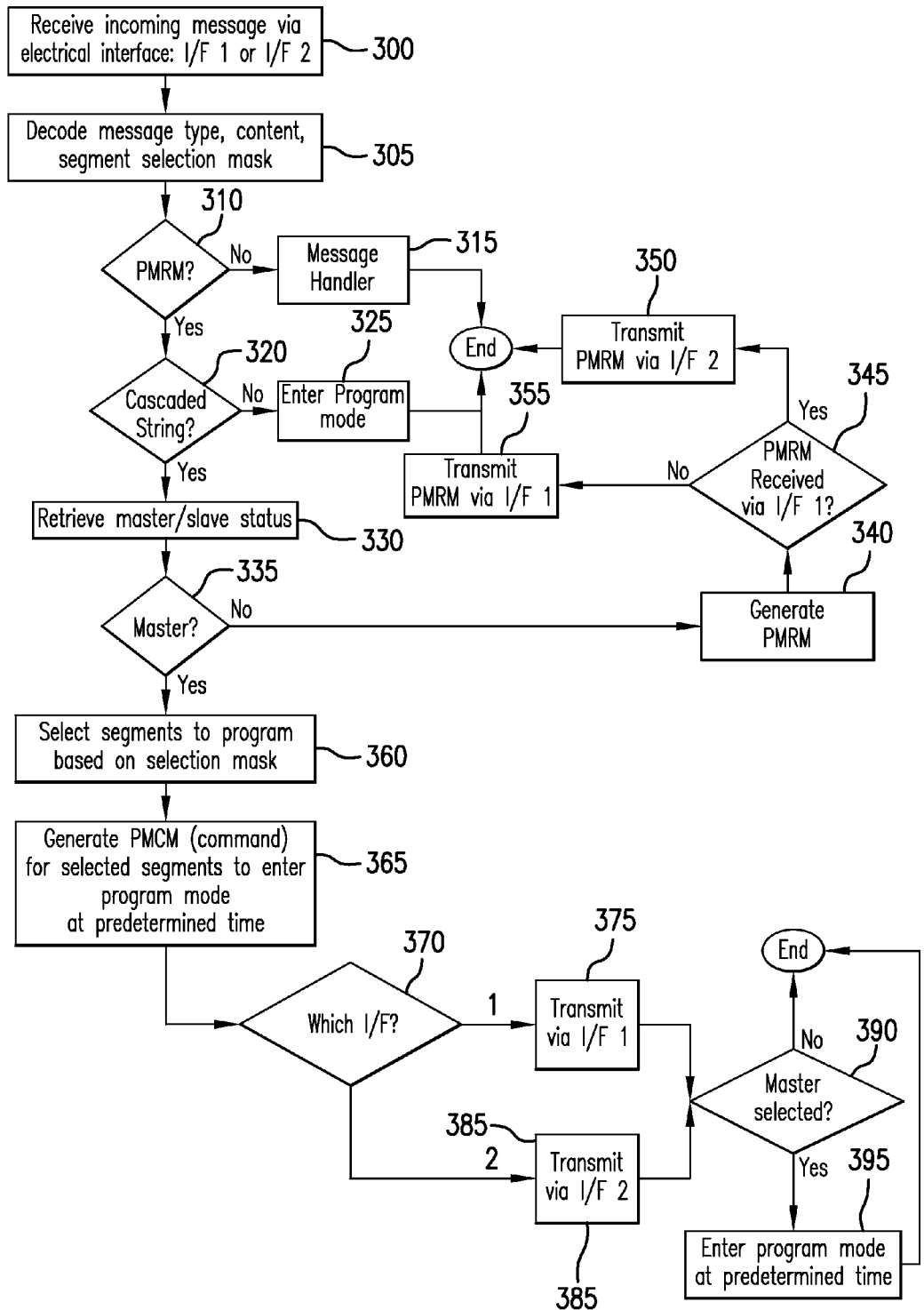
FIG. 3 depicts a flowchart of an exemplary method to handle programming mode request messages (PMRM) for controlling selected segments in a cascade-connected light curtain system.

FIG. 3 depicts a flowchart of an exemplary method to handle programming mode request messages for controlling selected segments in a cascade-connected light curtain system. As an illustrative example, steps of the method may be performed or caused to be performed by a processor, such as the micro A 735 and micro B 740, described with reference to FIG. 7, for example, while executing a set of instructions. The set of instructions may be tangibly stored in a non-transitory form, such as in a data store operably connected to the processor.

In the depicted flowchart, the method includes a step 300 to receive incoming messages via a first or a second electrical interface (I/F 1 or I/F 2). At each of the opposing ends of a cascadable light curtain segment, such as any of the RX LCM 105a-105d of FIG. 1, each end includes an electrical interface for making electrical connection to at least one additional light curtain segment. An example of such an electrical interface at a proximal end of an RX string 105 is described with reference to communication module 455 as described with reference to at least FIG. 4. An example of such an electrical interface at a distal end of an RX string 105 is described with reference to cascade interface 410, as described with reference to at least FIG. 4. The messages may be transported from either the first or second electrical interfaces to a processor via a communication bus. An example of such a communication bus and processor is described with reference to, for example, FIG. 7. The processor, as discussed herein, may be implemented in a single device or multiple devices with supporting components that may include, for example, analog and/or digital circuitry, and may include a microcontroller, DSP, ASIC, or a combination of multiple discrete, hybrid, and/or integrated circuits, components, or modules, whether active or passive, that collectively cooperate to perform the functions or operations described.

Upon receipt of the message, at step 305, the processor decodes the message to determine its type and content. The type of message may indicate its purpose, while the content may provide data, parameters, and information that may be used by the processor to perform various light curtain functions. The processor may also decode a segment selection mask, if present in the message. The segment selection mask indicates which segments of the cascade light curtain are intended to react to the contents of the message, for example. At step 310, the processor determines whether the decoded message type is a programming mode request message (PMRM). If it is not a PMRM type, then the processor uses its routine message handler functions to properly handle the message at step 315, and this method ends.

If it is a PMRM type, then the processor, at step 320, evaluates whether the LCM is connected in a cascaded string with at least one other LCM. If the LCM is not connected in a cascade string, then the processor accepts the PMRM as intended for itself, and it duly enters the program mode in step 325, and this method ends.

If the LCM is connected in a cascade string, then the processor retrieves, at step 330, master/slave status information for itself. If the processor is not assigned to be the master in the cascade string of LCMs, then the processor generates a programming mode request message (PMRM) at step 340. The generated PMRM may substantially reproduce the message type, content and selection mask information that was in the incoming message received at step 300 and decoded at step 305. If, at step 345, the PMRM received at step 300 was received via the I/F 1, then the processor causes the generated PMRM to be transmitted via I/F 2 350, and this method ends. If, at step 345, the PMRM received at step 300 was received via the I/F 2, then the processor causes the generated PMRM to be transmitted via I/F 1 at step 355, and this method ends. As such, the original PMRM may, in some embodiments, be effectively retransmitted via the electrical interface opposite the one it was originally received from in step 300. Accordingly, each LCM may effectively pass through the PMRM through the cascaded network of LCMs. The method then ends.

If, at step 335, the processor is assigned to be the master in the cascade string of LCMs, then the processor, at step 360, selects which segments of the cascade light curtain string to program based on the selection mask previously decoded in step 305. Using the selection information, the processor generates, at step 365, a programming mode command message (PMCM) for selected segments to enter program mode at a predetermined time, which may be determined by the processor. The predetermined time may be based, for example, on a predetermined time interval, or a number of clock periods sufficient to distribute the PMCM to all relevant LCMs and to allow each of the selected LCMs to prepare to enter the programming mode synchronously.

The processor next determines whether the selected segments to receive the PMCM are connected to the instant LCM via I/F 1 at step 370. If any of the selected segments connect via I/F 1, then the processor transmits the PMCM via I/F 1 at step 375. If any of the selected segments connect via I/F 2, then the processor transmits the PMCM via I/F 2 at step 385.

After transmitting the PMCM to other selected LCMs in the cascade string, or if there are no selected segments connected via either I/F 1 or I/F 2, then, at step 390, the processor determines whether the master LCM itself was selected by the selection mask. If the master LCM itself is not selected to enter programming mode, then the method ends. If the master LCM itself is selected to enter programming mode, then the processor itself enters the programming mode at the predetermined time at step 395, and then the method ends.

Figure 4:
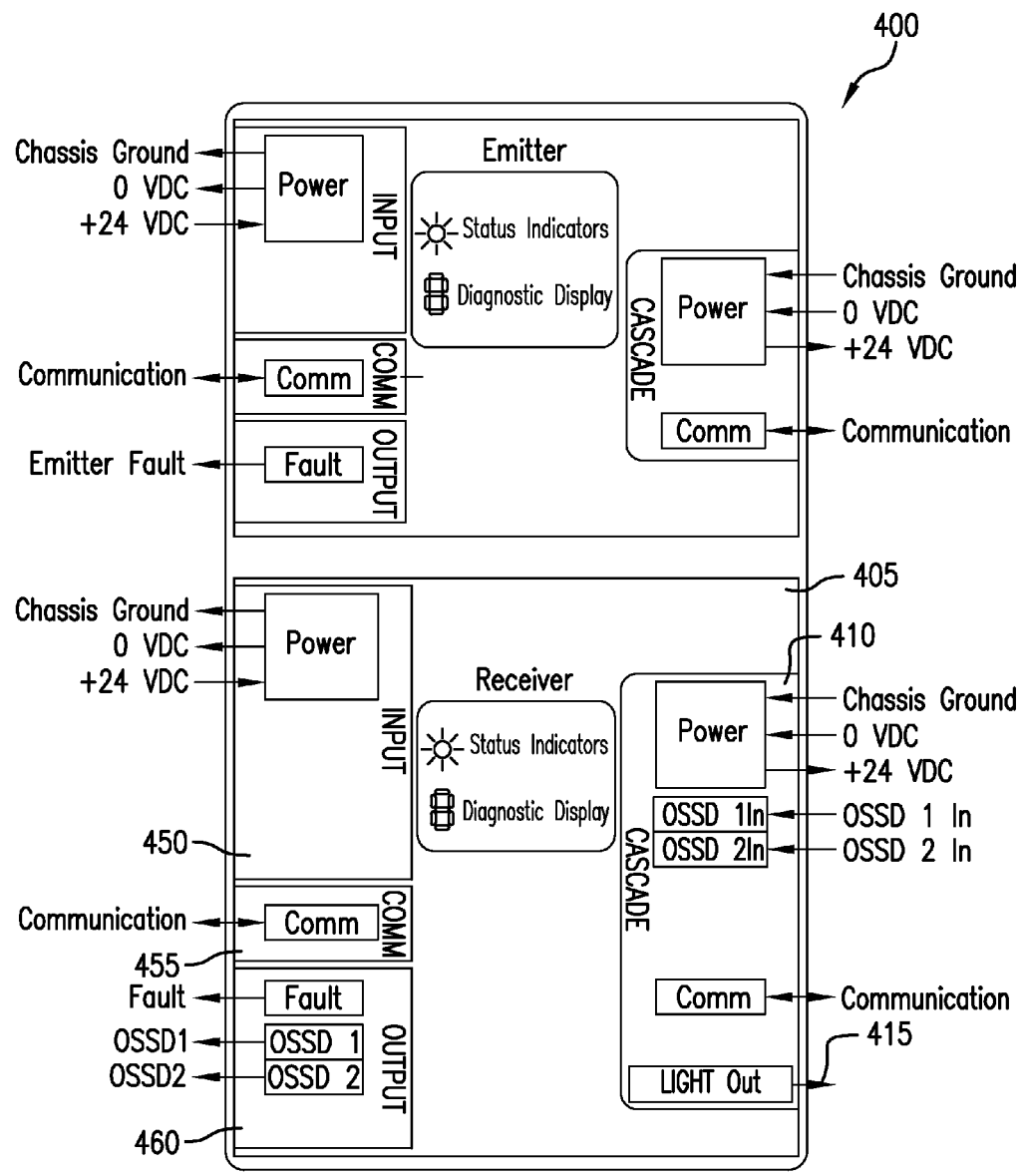
FIG. 4 depicts a schematic block diagram of an exemplary emitter and receiver of a cascadable light curtain segment operable to respond to a RMRGM.

FIG. 4 depicts a schematic block diagram of an exemplary emitter and receiver of a cascadable light curtain segment operable to respond to a RMRGM. In the depicted figure, a light curtain stage 400 (e.g., emitter and receiver) includes the receiver LCM 405, which has a cascade interface 410. The cascade interface 410 includes a light output port 415, along with power/ground (e.g., +24 VDC), OSSD (e.g., relay control signals to disable machinery, such as machinery described with reference to FIG. 1, in a protection scenario) and a bi-directional communication port for communicating, for example, with a downstream LCM. Further, the receiver LCM 405 includes one or more ports for a set of inputs 450, a communication (comm) module 455, and an output interface 460.

Figure 5A:
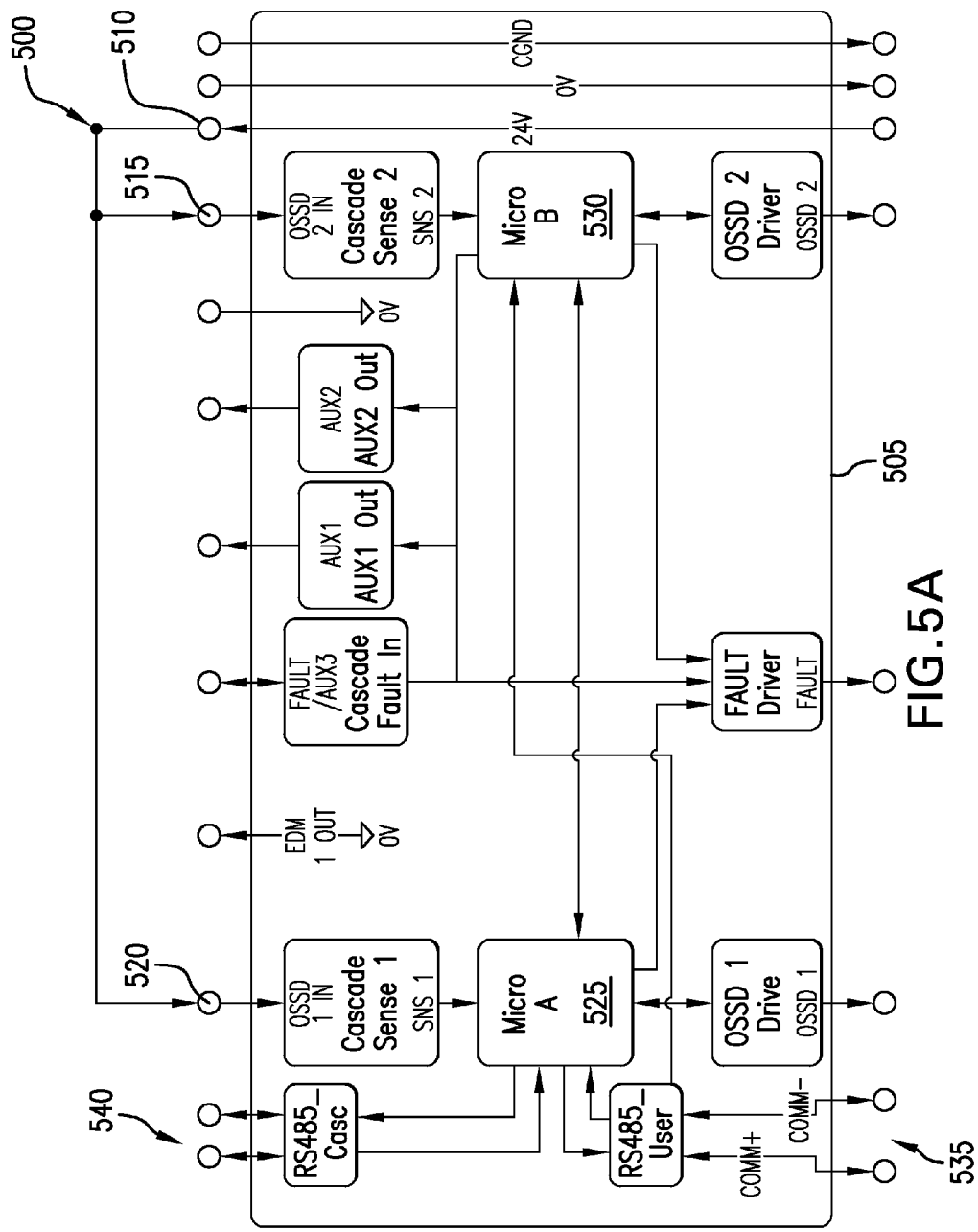
FIG. 5A-5B depict schematic block diagrams of exemplary cascadable end light curtains operable without or with a RMRGM interface module.

FIG. 5A depicts a schematic block diagram of an exemplary cascadable end light curtain operable without an RMRGM interface module. In FIG. 5A, a receiver LCM 500 includes a controller module 505 for a LCM, including a set of signal ports at a proximal end, and a set of signal ports at a distal end, referred to herein as a cascading electrical output port. In the depicted configuration, no RMRGM interface module is provided, however a termination plug is applied to the cascading electrical output port. In particular, the terminator routes supply voltage (24V) port 510 from the cascading electrical output port back into the cascading electrical output port's OSSD 2 IN port 515 and OSSD 1 IN port 520. The OSSD 1 IN port 520 circuitry outputs a sense signal to a microprocessor A 525, and the OSSD 2 IN port 515 circuitry outputs a sense signal to a microprocessor B 530. The micro A 525 communicates with the micro B 530, and with a RS485 port 535 on the proximal signal ports, and with a RS485 port 540 on the distal signal ports of the cascading electrical output port. In some embodiments, the micro A 525 may communicate with RS 485 port 540 in the event of a block. The RS485 port 535 may send signals to the micro A 525 to provide status. The micro A 525 may send a signal to the RS485 port 535 only for the purposes of performing, for example, a factory test.

Figure 5B:
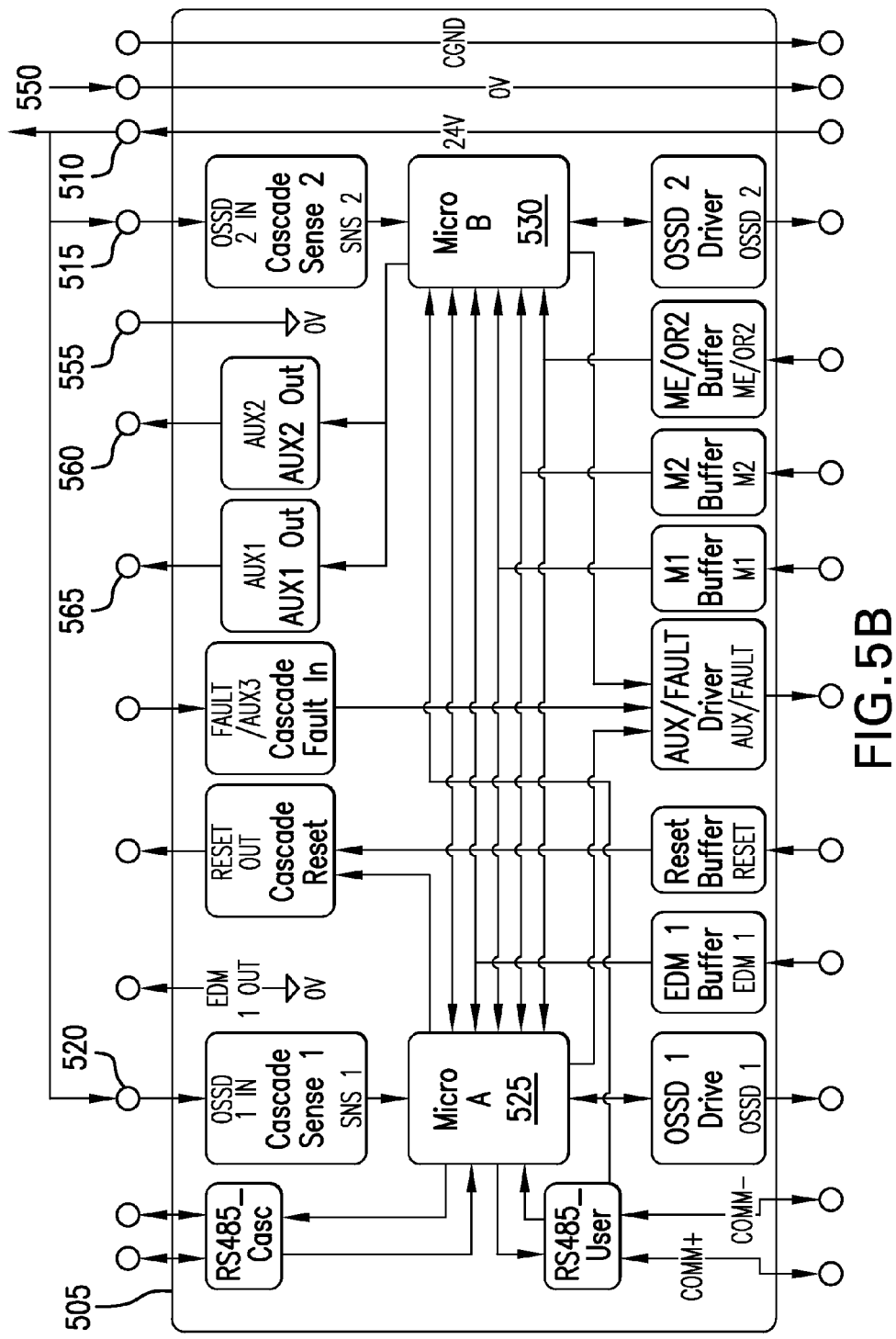

FIG. 5B depicts a schematic block diagram of an exemplary cascadable end light curtain operable to connect to an exemplary RMRGM interface module. When the controller module 505 connects to a RMRGM interface module pluggably connected to the cascading electrical output port, a 0V pass through net 550 is connected to the RMRGM interface module, as is the 24V port 510. 24V is routed through the RMRGM and into OSSD1 IN port 520. OSSD2 IN port 515 is left open (0V). The OSSD1 IN port 520 circuitry outputs a sense signal to a microprocessor A 525, and the OSSD2 IN port 515 circuitry outputs a sense signal to a microprocessor B 530. The micro A 525 communicates with the micro B 530, and with a RS485 port 535 on the proximal signal ports, and with a RS485 port 540 on the distal signal ports of the cascading electrical output port. In some embodiments, the micro A 525 may communicate with RS 485 port 540 in the event of a block. The RS485 port 535 may send signals to the micro A 525 to provide status. The micro A 525 may send a signal to the RS485 port 535 only for the purposes of performing, for example, a factory test.

FIG. 6 depicts a schematic block diagram of an exemplary cascadable protective light curtain system operable with a RMRGM interface module. In the depicted system 600, at least two emitters are connected in cascade, as are a corresponding number of cascade-connected receivers. The receiver at the proximal end of the string may be configured as the master, and the downstream receiver LCMs may be configured as slaves. In the depicted embodiment, the end (also referred to herein as distal-most) slave receiver and the end slave emitter both have a RMRGM interface module installed to provide communication of status and control information between the cascade-connected light curtain and the RMRGM being operated by the user. In some embodiments, fault and/or status conditions identified in operation of any one of the emitters in the string will be propagated to the end slave emitter, and converted to a corresponding message indicative of the status condition that can be sent for display to the user on the RMRGM.

In the depicted system of FIG. 6, the master receiver at its proximal port, outputs signals (cascade fault signal 610, OSSD1, OSSD2, Comm), and the master receiver receives as inputs power supply, scan code in, and EDM. In some implementations, these proximal port input and output signals may be connected so as to interface to one or more additional cascade-connected LCMs (not shown). In this embodiment, the end (distal-most) receiver and emitter terminate in a RMRGM interface module.

Figure 7:
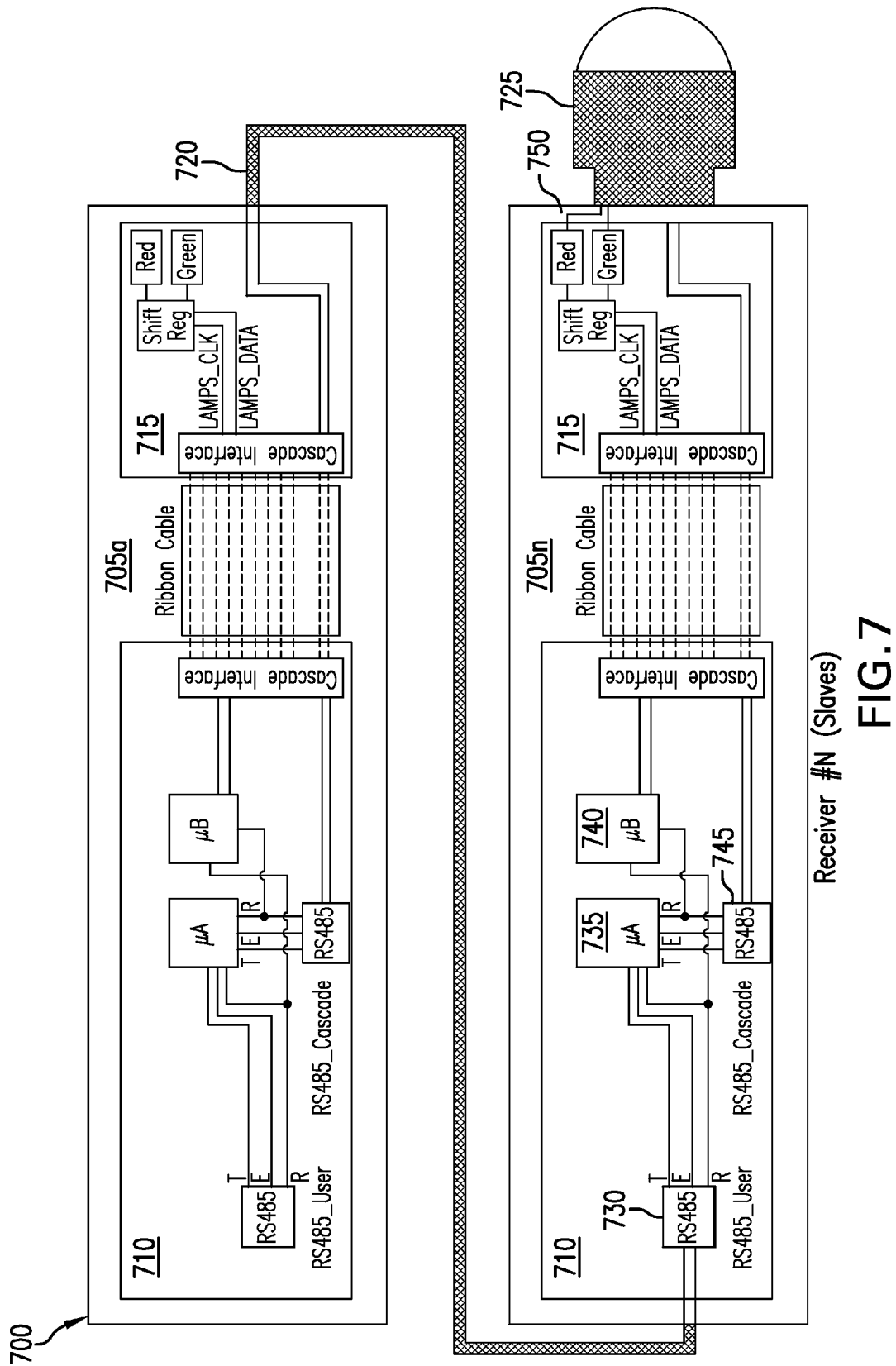
FIG. 7 depicts a schematic block diagram of an exemplary cascaded light curtain configured to carry out the method of FIG. 3.

FIG. 7 depicts a schematic block diagram of an exemplary cascaded light curtain configured to carry out the method of FIG. 3. In the depicted figure, a cascade network 700 has a string of N substantially similar light curtain modules 705a-705n. Each LCM 705 includes, in relevant part, a control module 710, operably connected to a cascade interface module 715 via a ribbon cable. The cascade output signal from each of the LCM 705a-705($n$−1) is routed to an input of control module 710 of the subsequent (slave) LCM 705 via a cable 720. The cascade output signal from the end slave LCM 705n is routed into RMRGM interface module 725. This cascade output signal may control, for example, the receiving and transmission of mode and/or status information with the RMRGM via a wired or wireless communication link.

The control module 710 includes an RS 485 interface 730, a micro A 735, a micro B 740, and an RS 485 Cascade interface 745. An exemplary implementation of the micro A 735 and micro B 740 is described with reference to micro A 525 and micro B 530 in FIGS. 5A-5B. The interface 730 receives a cascaded message signal generated by an upstream LCM 705a.

In accordance with the method described with reference to FIG. 3, a message, such as a PMCM, may be received via the proximal electrical interface, i.e., the RS 485 interface 730. The micro A 735 may receive and process the message type, content and selection mask. The content of the message may include status information, which may have been supplied by the LCM 705a, or any proximally-connected LCM in the cascade string. If the selection mask corresponds to the LCM 705n, then the micro A 735 and/or micro B 740 may process the message content. They may respond to the message, including preparing to enter the prescribed programming mode, such as at a predetermined time, or in response to a synchronization signal communicated among the LCM 705a-705n.

In some embodiments, the micro A 735 and/or the micro B 740 may, as the distal-most segment in the cascade string, generate and transmit status condition signals, via the interface 745 to the RMRGM interface module 725. The status signals may be formed as a message containing status information from the message as received by the micro A 735, and may further include status information supplied by the micro A 735 pertaining to the LCM 705n itself. From there the message may be communicated to the RMRGM 220 (see FIG. 2) via a communication link. The status content in the message may be subsequently stored in a data store on the RMRGM 220, and/or displayed to the user via a graphical user interface, such as the user interface 225 of FIG. 2, for example. At a distal-most end of the LCM 705n, a housing may provides an electrical-mechanical interface 750 to releasably couple the RMRGM interface module 725 to the LCM 705n. In some implementations, the interface 750 may be a pluggable interface, for example. In some other implementations, the interface may be substantially permanently connected (e.g., not readily field swappable). In some examples, the electrical and mechanical coupling may be effectively formed so as to render the RMRGM interface module 725 an integral part of the LCM 705n.

Although various embodiments have been described with reference to the Figures, other embodiments are possible. For example, some embodiments may attach a RMRGM interface module to a distal end of a terminal light curtain connected in a string of light curtains arranged in a network. In some implementations, the network of light curtains may include segments of one or more serially connected light curtains. Some networks may include one or more branches of parallel strings of serially cascaded light curtain segments. The light curtains in the network may be receivers, transmitters, or a combination of both. Some light curtain segments may include optical transmitter elements, optical receiver elements, or both.

In some implementations, various embodiments as described herein may provide data collection services in a network. Some embodiments may communicate diagnostic control and data information related to protective light curtain status with a remote server, for example. Some examples may employ RFID (radio frequency identification) tags or labels to provide local communication of information in order to promote contactless data collection, for example. In some examples, the infrastructure enhancements described herein may advantageously support wireless communication for updates to software in some protective light curtain systems, for example. In one illustrative example, some embodiments may be adapted to perform a remote test, for example, to simulate a beam blocked condition.

In some embodiments, with reference to FIG. 1 and for purposes of handling programming mode request messages received from a remote request generator, the master segment of the RX string 105 may be any one of the RX LCM 105a-105d connected in a cascade network. For example, some implementations may be configured to allow the distal-most segment (e.g., RX LCM 105d with reference to FIG. 1) to perform the function described herein for the master module. As such, in some embodiments, the RFB switch accessory 120 may generate the programming mode request message and transmit that request message to the RX LCM 105d via a communication link 130. In response, the RX LCM 105d, acting as a master segment in the cascaded RX string 105 for purposes of handling the programming mode request message, may process the indication that the programming mode request message has been received, identify which of the RX LCM 105a-105d are to be placed into a predetermined mode, and generate a programming mode command to cause each one of the identified RX LCM 105a-105d to enter into a programming mode according to the programming mode request message.

In various implementations, the master segment may be determined based on a predetermined configuration that specifically determines how the string of light curtain segments select which segment is to operate in the master mode with regard to responding to a programming mode request message (PMRM). By way of example, and not limitation, the master segment configuration control may be pre-configured in hardware, firmware, or software. The master selection may be a function of position in the string (e.g., most proximal, most distal, an intermediate position), and/or may be a function of relative configuration (e.g., update revision in software, hardware model). This may advantageously permit, for example, a string of light curtain segments to automatically identify a master segment for purposes of reacting to a PMRM. In some embodiments, the light curtain segments may automatically detect whether they are in a master position by attempting to communicate with adjacent segments via their proximal and/or distal electrical interfaces.

In some implementations, each of the light curtain segments in a cascade-connected string may be configured to independently "receive, react and retransmit" in response to a PMRM. In such implementations, each segment of the light curtain system may synchronously enter the requested programming mode state in a coordinated manner. For example, in response to receiving the PMRM, each segment may receive, process and transmit coordination messages on a communication bus that is capable of communicating such messages to all of the other segments that are connected in the network. When the segment receives a coordination message that indicates which other segments are ready to enter the programming mode. In an illustrative example, a communication message (e.g., 1100) may indicate that the two proximal-most segments are ready to enter the programming mode state, and the two distal-most segments are not yet ready to do so. When this message is received by the distal-most segment, which processes the message and determines that the segment is ready to enter the programming mode state, the distal-most segment may re-transmit a processed version of the communication message (e.g., 1101) to indicate it is also now in the ready state. In this way, when all the segments have received a coordination message (e.g., 1111) that indicates every segment in the string is ready to enter the programming mode, then every segment can automatically enter the programming mode within a predetermined time (e.g., clock cycles) after receipt of the coordination message. As such, no master segment is required to be defined in order for each segment of the string to enter the programming mode in response to the PMRM.

Some cascade-connected light curtain string embodiments that provide this functionality without specifying a master segment may respond to a PMRM that includes a selection mask or other indicator(s) to select specific segments of the light curtain string to enter the programming mode, while other (non-selected) segments are not in the programming mode (e.g., remain in RUN mode). In an illustrative example, the light curtain segments may "receive, react and retransmit" to PMRM that includes a selection mask (e.g., 01100) indicating that only the second and third segments of system with 5 cascade-connected segments are to enter a requested programming mode. As the second segment, for example, receives, reacts, and retransmits the PMRM, it may also transmit a communication message (e.g., x10xx) to indicate that the second segment in the string is ready to enter the programming mode state, and the third segment is not known yet to be ready to do so. When this message is received by the third segment, which processes the message and determines that the third segment is ready to enter the programming mode state, the third segment may re-transmit a processed version of the communication message (e.g., x11xx) to indicate it is also now in the ready state. In this way, when all the selected segments have received a coordination message (e.g., x11xx) that indicates every selected segment in the string is ready to enter the programming mode, then all the selected segments can automatically enter the programming mode within a predetermined time (e.g., clock cycles) after receipt of the coordination message. As such, no master segment is required to be defined in order for each of the selected segments of the string to enter the programming mode in response to the PMRM, while the other (non-selected) segments do not enter the programming mode.

In some embodiments, a communication bus may transport signals propagating from segment to segment in a cascade-connected light string. The communication bus may transport signals, including the PMRM and/or coordination messages, received at the proximal interface to the distal interface of a light curtain segment. In some embodiments, the signal may be buffered to maintain, for example, signal integrity as the signal propagates through the cascaded string of light curtain segments. In some implementations, signals received at the proximal interface may be received at a communications port of a device, such as a microcontroller, for example, and retransmitted as a subsequent operation to the distal interface.

Conversely, such a communication bus may transport signals, including the PMRM and/or coordination messages, received at the distal interface to the proximal interface of the light curtain segment. In some embodiments, the signal may be buffered to maintain, for example, signal integrity as the signal propagates through the cascaded string of light curtain segments. In some implementations, signals received at the distal interface may be received at a communications port of a device, such as a microcontroller, for example, and retransmitted as a subsequent operation to the proximal interface.

In some implementations, each segment of a cascade-connected string of light curtain modules (LCM) may have substantially identical hardware and software. However, some implementations may advantageously employ non-identical LCMs. For example, a cascade connection of LCMs may employ segments of different lengths. In some implementations, the distal-most LCM may have an integrated interface module for establishing the wireless link that connects to the remote request generator module.

In some implementations, and with reference to FIG. 1, a protected machine may be powered down for routine maintenance. Once the maintenance is completed, an operator may attempt to apply power to the machine but an object or operator is blocking one or more horizontal light beams between the emitter TX LCM 110 and receiver RX LCM 105, thereby indicating a safety breach. The light curtain system 100 is operatively connected to enable, for example, a press machine (not shown) once the light beams are cleared. In various embodiments, it is anticipated that multiple light curtain systems may reside on a given manufacturing machine, based upon the complexity, number of transformational operations or hazardous regions present. In this manner, the ability to remotely and selectively, if needed, program any or all segments in a cascade-connected light curtain system may advantageously permit an operator to rapidly configure systems with changing requirements that may involve adjusting the position or introducing or removing an obstruction to one or more optical beams. Accordingly, this improved functionality expands the flexibility to use complex arrangements of light curtain segments to protect equipment without burdensome restrictions or costs associated with changing the configuration in a way that may impact the light curtain. This may advantageously permit operators to make adjustments to light curtain protected equipment with quick, convenient reprogramming of compound light curtains.

In some examples, a segment acting as a slave segment in the cascaded RX string 105, may retransmit or propagate an indication that the programming mode request message has been received to the next proximally-adjacent RX LCM 105c. In response, the RX LCM 105c, acting as a slave segment in the cascaded RX string 105, may retransmit or propagate an indication that the programming mode request message has been received to the next proximally-adjacent RX LCM 105b. In response, the RX LCM 105b, acting as a slave segment in the cascaded RX string 105, may retransmit or propagate an indication that the programming mode request message has been received to the next proximally-adjacent RX LCM 105a. In response, the RX LCM 105a, acting as a master segment in the cascaded RX string 105, may process the indication that the programming mode request message has been received, identify which of the RX LCM 105a-105d are to be placed into a predetermined mode, and generate a programming mode command to cause each one of the identified RX LCM 105a-105d to enter into a programming mode according to the programming mode request message.

Some networks may include one or more branches of at least one light curtain, where the branches may be connected in parallel. In some examples, the branches may branch off from a connection to a common light curtain or a common control node. In some embodiments, a single RMRGM interface module may initiate or terminate a programming mode for the serial cascade-connected light curtain segments in its branch only. In some embodiments, a single RMRGM interface module may control a programming mode for every light curtain in the parallel-series connected network of cascade light curtain segments to which it is connected.

Various embodiments may provide a field replaceable accessory light that is large and bright enough to be seen from a distance but is also able to be plugged directly into the light curtain cascade port. By way of example and not limitation, embodiments of an accessory light that may include a wired or wireless communication interface operable to receive/transmit requests and status information between a request generator source and the cascade-connected light curtain segments are described, for example with reference to at least FIGS. 1-3 in U.S. patent application Ser. No. 14/819,264, titled "Field Installable Light Curtain Status Module," filed by Gelineau, et al., on Aug. 5, 2015, the entire contents of which are incorporated herein by reference.

In some embodiments, a modular plug-in RMRGM interface module accessory may include a connector for making pluggable electrical connection to a cascading electrical output port for providing cascading connection from an elongate light curtain. The accessory may incorporate an omni-directional light indicator to illuminate a light signal indicative of a status of the light curtain, wherein the accessory is configured to releasably make or break operative connection to the end cap containing the output port while the end cap is sealably connected to an end of the light curtain.

In various implementations, a light accessory may be pluggably connectable to an end cap of a light curtain segment. At least one large, omni-directional indicator light may visually indicate operational status (e.g., shut down, clear, muting, and programming) of the light curtain.

Generally, muting may refer to a state in which the light curtain system may ignore a blockage of one or more light curtain beam(s), typically for a limited period of time. When in a muted state, for example, the light curtain may not respond to blockage of one or more light beams, e.g., the light curtain may not disable operation of machinery operatively connected to the light curtain in response to the blockage.

In some cases, a light curtain field may intersect a stationary object that, although present in the region protected by the light curtain, is to be ignored by the safety system. In such circumstances, light curtains may be programmed to "blank" certain "fixed" positions where no signal is received. Some systems may even operate to disable protected equipment if a beam is detected by a receiver element programmed with "fixed blanking."

Safety light curtains are commonly used in manufacturing to provide an invisible fence of protection such that objects or persons passing through them will trigger an emergency stop of machinery thereby protecting human life. It is common practice for these light curtains to be extendable or cascaded to provide coverage over a larger surface area as an alternative to making custom lengths. The curtain must be cleared in order to restart the machinery.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. A cascadable light curtain apparatus arranged to receive requests from a remote request generator, the apparatus comprising:
   a housing extending along a longitudinal axis between a proximal end and a distal end of a light curtain segment;
   a distal electrical interface disposed at a distal end of the housing;
   a proximal electrical interface disposed at a proximal end of the housing;
   a processor system disposed in the housing and operatively coupled to send and receive communication signals via the distal electrical interface and the proximal electrical interface; and,
   a data store coupled to the processor system and containing a program of instructions that, when executed by the processor, cause the processor to perform operations to control a programming mode of one or more cascadable light curtain segments that are connected in a cascade arrangement, the operations comprising:
      receive a request signal via the distal electrical interface;
      determine if the received request signal contains an initial predetermined programming mode request (PPMR);
      retrieve status information that indicates whether the light curtain segment is a master or a slave in the one or more cascadable light curtain segments;
      if the retrieved status information indicates that the light curtain segment is a slave in the string of cascade connected light curtain segments, and the request signal contains the initial PPMR:
         generate a replica PPMR that substantially reproduces the initial PPMR, and,
         transmit the replica PPMR via the proximal electrical interface;
      if the retrieved status information indicates that the light curtain segment is a master in the string of cascade connected light curtain segments, and the request signal contains the initial PPMR:
         select which segments of the one or more cascadable light curtain segments to program based on the request signal,
         generate a cascade programming mode command signal (CPMCS) for the selected segments of the one or more cascadable light curtain segments, and,
         transmit the CPMCS via at least one of the distal electrical interface and the proximal electrical interface to cause each of the one or more cascadable light curtain segments to enter a predetermined learn mode.

2. The apparatus of claim 1, wherein the predetermined learn mode comprises a fixed blanking programming mode.

3. The apparatus of claim 1, wherein the predetermined learn mode comprises a floating blanking programming mode.

4. The apparatus of claim 1, wherein the predetermined learn mode comprises a reduced resolution programming mode.

5. The apparatus of claim 1, wherein the distal electrical interface is configured to be operatively coupled to receive the request signal from an adjacent distal light curtain segment in the one or more cascadable light curtain segments.

6. The apparatus of claim 1, wherein the remote request generator source comprises a key switch module.

7. The apparatus of claim 1, wherein the predetermined learn mode request comprises a request to activate a learn mode in one or more selected light curtain segments in the cascadable light curtain segments.

8. The apparatus of claim 1, wherein the predetermined learn mode request comprises a request to deactivate the learn mode in selected light curtain segments in the cascadable light curtain segments.

9. The apparatus of claim 1, the operations further comprising:
   enter the predetermined learn mode in response to generating the cascade learn mode signal.

10. The apparatus of claim 1, the operations further comprising:
    receive, via the proximal electrical interface, a cascade learn mode signal generated by another light curtain segment in the cascadable light curtain segments; and,
    enter the predetermined learn mode in response to the received cascade learn mode signal.

11. The apparatus of claim 1, wherein the request signal originates from a remote request generator source that communicates the request signal to at least one of the cascadable light curtain segments via a remote communication link.

12. The apparatus of claim 11, wherein the remote communication link is wireless, and wherein remote request generator source comprises a handheld mobile device presenting a graphical user interface on a display device, the handheld mobile device operable to generate the request signal for transmission in response to user input from an operator interacting with the graphical user interface.

13. The apparatus of claim 12, wherein the handheld mobile device is configured to initiate a fixed blanking programming mode for a specifically addressed cascade-connected light curtain segment that is selected by the operator using the graphical user interface of the handheld mobile device.

14. A cascadable light curtain apparatus arranged to receive requests from a remote request generator, the apparatus comprising:
    a first electrical interface disposed at a first end of a housing;
    a second electrical interface disposed at a second end of the housing;
    a processor system disposed in the housing and operatively coupled to send and receive communication signals via the first electrical interface and the second electrical interface; and, a data store coupled to the processor system and containing a program of instructions that, when executed by the processor, cause the processor to perform operations to control a programming mode of one or more cascade-connected light curtain segments that are connected in a cascade arrangement with the light curtain segment that contains the processor system, the operations comprising:
receive a request signal via the first electrical interface;
determine if the received request signal contains an initial predetermined mode request (PMR);
retrieve status information that indicates whether the light curtain segment is a master or a slave in the one or more cascade-connected light curtain segments;
if the retrieved status information indicates that the light curtain segment is a slave in the string of cascade connected light curtain segments, and the request signal contains the initial PMR:
  generate a replica PMR that substantially reproduces the initial PMR, and,
  transmit the replica PMR via the proximal electrical interface;
if the retrieved status information indicates that the light curtain segment is a master in the string of cascade connected light curtain segments, and the request signal contains the initial PMR:
  select which segments of the one or more cascadable light curtain segments to program based on the request signal,
  generate a cascade programming mode command signal (CPMCS) for the selected segments of the one or more cascadable light curtain segments, and,
transmit the CPMCS via at least one of the distal electrical interface and the proximal electrical interface to cause each of the one or more cascade-connected light curtain segments to enter a predetermined mode.

15. The apparatus of claim 14, wherein the predetermined mode comprises a fixed blanking programming mode.

16. The apparatus of claim 14, wherein the predetermined mode comprises a floating blanking programming mode.

17. The apparatus of claim 14, wherein the predetermined mode comprises a reduced resolution programming mode.

18. The apparatus of claim 14, wherein the request signal originates from a remote request generator source that communicates the request signal to at least one of the cascade-connected light curtain segments via a remote communication link.

19. The apparatus of claim 18, wherein the remote communication link is wireless, and wherein the remote request generator source comprises a handheld mobile device presenting a graphical user interface on a display device, the handheld mobile device operable to generate the request signal for transmission in response to user input from an operator.

20. The apparatus of claim 19, wherein the handheld mobile device is configured to initiate a fixed blanking programming mode for a specifically addressed cascade-connected light curtain segment that is selected by the operator using the graphical user interface of the handheld mobile device.

* * * * *